US011063485B2

(12) United States Patent
Paul et al.

(10) Patent No.: US 11,063,485 B2
(45) Date of Patent: Jul. 13, 2021

(54) INTERIOR PERMANENT MAGNET MACHINE WITH HYBRID ROTOR TOPOLOGY

(71) Applicant: STEERING SOLUTIONS IP HOLDING CORPORATION, Saginaw, MI (US)

(72) Inventors: Subhra Paul, Saginaw, MI (US); Mohammed R. Islam, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 27 days.

(21) Appl. No.: 16/408,763

(22) Filed: May 10, 2019

(65) Prior Publication Data

US 2019/0348878 A1 Nov. 14, 2019

Related U.S. Application Data

(60) Provisional application No. 62/670,486, filed on May 11, 2018.

(51) Int. Cl.
*H02K 1/12* (2006.01)
*H02K 1/27* (2006.01)

(52) U.S. Cl.
CPC .............. *H02K 1/276* (2013.01); *H02K 1/12* (2013.01)

(58) Field of Classification Search
CPC ...... H02K 21/04; H02K 1/276; H02K 1/2766; H02K 1/12

USPC ................ 310/181, 156.53, 156.56, 156.57, 310/216.015, 216.016, 216.017, 216.018
See application file for complete search history.

(56) References Cited

U.S. PATENT DOCUMENTS

| 5,962,944 A * | 10/1999 | Narita ................... H02K 1/276 310/156.53 |
| 2003/0062792 A1* | 4/2003 | Reiter, Jr. ............ H02K 1/2773 310/156.56 |
| 2015/0333582 A1 | 11/2015 | Tsuchida |

FOREIGN PATENT DOCUMENTS

| CN | 1215942 A | 5/1999 |
| JP | 2006115584 A | 4/2006 |
| JP | 2010068600 A | 3/2010 |
| WO | 2014097478 A1 | 6/2014 |

(Continued)

OTHER PUBLICATIONS

First Office Action and Search Report regarding corresponding CN App. No. 2019103932797; dated Dec. 8, 2020.

*Primary Examiner* — Terrance L Kenerly
(74) *Attorney, Agent, or Firm* — Dickinson Wright PLLC (57) ABSTRACT

An interior permanent magnet motor assembly including a stator and a rotor is provided. The stator includes electromagnetic windings. The rotor is disposed concentrically with the stator about a rotor axis and the rotor has a plurality of rotor segments. The plurality of rotor segments may include a first rotor segment and a second rotor segment. The first rotor segment may have first pockets being arranged to receive at least a first magnet of a first magnet set according to a first rotor topology. The second rotor segment may be axially stacked relative to the first rotor segment about the rotor axis. The second rotor segment may be arranged to receive at least a second magnet of a second magnet set according to a second rotor topology having a configuration that is different than the first rotor topology.

9 Claims, 5 Drawing Sheets

(56) References Cited

FOREIGN PATENT DOCUMENTS

WO    WO-2017051505 A1 *   3/2017   ............. H02K 21/44

* cited by examiner

INTERIOR PERMANENT MAGNET MACHINE WITH HYBRID ROTOR TOPOLOGY

CROSS-REFERENCES TO RELATED APPLICATIONS

This patent application claims priority to U.S. Provisional Patent Application Ser. No. 62/670,486, filed May 11, 2018 which is incorporated herein by reference in its entirety.

BACKGROUND

An interior permanent magnet machine or assembly typically includes a stator having stator coil windings and a rotor having permanent magnets that cooperate with stator poles defined by the stator coil windings. The stator coil windings may be energized by an electrical current to provide rotor torque when the machine is acting as a motor. The interaction of an electromagnetic flux flow path created by the stator coil windings with a flux flow path created by the permanent magnets may be accompanied by harmonic waveform components. These harmonic components may introduce torque ripple, increased cogging torque, or back-EMF harmonics.

SUMMARY

According to one aspect of the disclosure, an interior permanent magnet motor assembly includes a stator and a rotor. The stator includes electromagnetic windings. The rotor is disposed concentrically with the stator about a rotor axis and the rotor has a plurality of rotor segments. The plurality of rotor segments includes a first rotor segment and a second rotor segment. The first rotor segment has first pockets being arranged to receive at least a first magnet of a first magnet set according to a first rotor topology. The second rotor segment is axially stacked relative to the first rotor segment about the rotor axis. The second rotor segment is arranged to receive at least a second magnet of a second magnet set according to a second rotor topology having a configuration that is different than the first rotor topology.

According to another aspect of the disclosure, a rotor for an interior permanent magnet motor assembly includes a rotor core having a first rotor segment and a second rotor segment axially stacked with one another about a rotor axis. The first rotor segment defines a plurality of first magnet pockets. A first magnet is received within a first pocket of the plurality of first magnet pockets. The second rotor segment defines a plurality of second magnet pockets. Each of the plurality of first magnet pockets is arranged with each of the plurality of second magnet pockets such that a first magnetism north pole of the first rotor segment shares an axis with a second magnetism north pole of the second rotor segment.

According to yet another aspect of the disclosure, an interior permanent magnet motor assembly includes a stator and a rotor. The stator defines a central opening. The rotor assembly is disposed within the central opening and includes a first rotor segment having a first plurality of magnet pockets defining a first rotor topology and a second rotor segment having a second plurality of magnet pockets defining a second rotor topology. The first rotor topology is further defined as having a V-type configuration and the second rotor topology is further defined as having a configuration different than the V-type configuration. The first rotor segment and the second rotor segment are axially stacked with one another such that one of the first plurality of magnet pockets at least partially extends over one of the second plurality of magnet pockets from an axial perspective.

These and other advantages and features will become more apparent from the following description taken in conjunction with the drawings.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the Figures, where the present disclosure will be described with reference to specific embodiments, without limiting same, it is to be understood that the disclosed embodiments are merely illustrative of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Interior permanent magnet assemblies may offer torque density improvements as compared to surface permanent magnet assemblies. Interior permanent magnet assemblies may have further benefits over surface permanent magnet assemblies such as, for example, a wider field weakening or a constant power region, a presence of reluctance torque and alignment torque (e.g. overall higher torque density for a same current density), better magnet retention, less risk of demagnetization, and less short circuit current.

Existing interior permanent magnet assembly topologies may have some drawbacks that impact overall performance and efficiency of the interior permanent magnet assembly such as, for example, cogging torque, back-emf harmonics, and torque ripple/ripple in shaft torque. An interior permanent magnet assembly employing a hybrid rotor topology according to the present disclosure may be provided to overcome these drawbacks and provide a more efficient interior permanent magnet assembly that also reduces induced motor torque fluctuations.

Figure 1A:
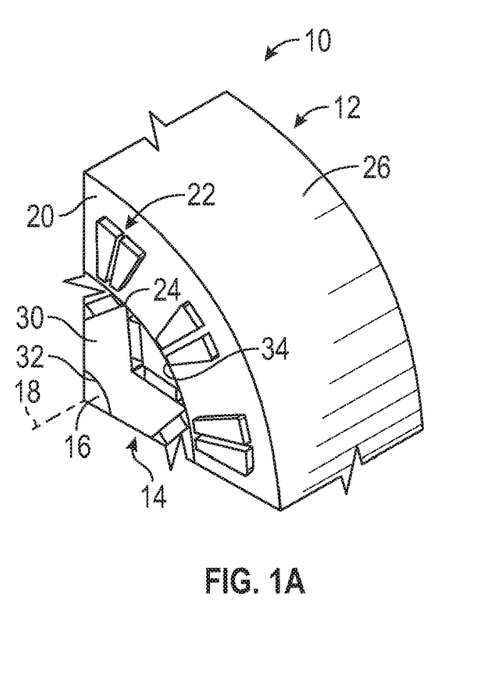
FIG. 1A is a perspective view of an example of a portion of an interior permanent magnet motor assembly.

FIGS. 1A through 3 illustrate examples of portions of interior permanent magnet machines, also referred to as interior permanent magnet assemblies herein. FIG. 1A illustrates an example of a portion of an interior permanent magnet machine or assembly, referred to generally as an interior permanent magnet motor assembly 10 herein. The interior permanent magnet motor assembly 10 may be an interior permanent magnet synchronous machine that may be employed in applications requiring a compact, efficient, and high torque density interior permanent magnet motor assembly. The interior permanent magnet motor assembly 10 may include a stator 12, a rotor assembly 14 that is disposed concentric with the stator 12 about a rotor axis 18, and a rotor shaft 16 upon which the rotor assembly 14 is seated. The rotor shaft 16 may define the rotor axis 18 about which the rotor assembly 14 rotates. The stator 12 and the rotor assembly 14 may each be disposed about and extend along the rotor axis 18.

The stator 12 includes a stator core 20 and electromagnetic windings 22. A first end of each of the electromagnetic windings 22 may be disposed proximate an inner stator surface 24 and a second end of each of the electromagnetic windings 22 may be spaced apart from an outer stator surface 26. The electromagnetic windings 22 may be shaped to taper in a direction that extends from the outer stator surface 26 towards the inner stator surface 24 and such that a width of each winding of the plurality of electromagnetic windings 22 decreases along the taper direction. Alternatively, the electromagnetic windings 22 may taper in a direction that extends from the inner stator surface 24 towards the outer stator surface 26. The electromagnetic windings 22 may have a substantially constant cross-sectional form that extends at least partially between the inner stator surface 24 and the outer stator surface 26.

The rotor assembly 14 may be rotatably disposed within the stator 12 about the rotor shaft 16 such that the interior permanent magnet motor assembly 10 is arranged as an interior rotor motor. In another example, the rotor assembly 14 may be disposed about the stator 12 to define an exterior rotor motor.

The rotor assembly 14 may include a rotor core 30 that is disposed on the rotor shaft 16. The rotor core 30 may radially extend (relative to the rotor axis 18) between an inner rotor surface 32 and an outer rotor surface 34. The inner rotor surface 32 may contact the rotor shaft 16 and may be disposed closer to the rotor axis 18 than the outer rotor surface 34. The outer rotor surface may be spaced apart from the inner stator surface 24 by, for example, an air gap therebetween.

The rotor assembly 14 of the interior permanent magnet motor assembly 10 may include a plurality of rotor segments having different rotor topologies. Each of the plurality of rotor segments may be axially stacked relative to one another along the rotor axis 18. The different rotor topologies may employ different magnet or magnet pocket configurations such as, for example, a V-type, a spoke-type, a bar-type, or an I-type as further described herein. It is contemplated that each of the plurality of rotor segments axially stacked may have various rotor topologies with certain characteristics varied. Examples of the characteristics which may be varied include a rotor segment axial length, a magnet length, a magnet thickness, a pole arc angle of magnet pockets, a magnet pocket configuration or a presence of flux barriers. The plurality of rotor segments or different rotors having different rotor topologies that may be stacked relative to one another along the rotor axis 18 may improve cogging torque, harmonics in induced voltage, and ripple in shaft torque.

Combining or stacking rotors having different rotor topologies may cancel cogging by having individual rotors or rotor segments provide cogging of equal magnitude but in an opposite phase. Further, the combining or stacking of rotors having different rotor topologies may achieve sinusoidal induced voltage through harmonic cancellation.

FIGS. 1B-1F illustrate examples of portions of the rotor assembly 14. The rotor assembly 14 may include a first rotor segment 40 having a first rotor topology and a second rotor segment 42 having a second rotor topology. The first rotor segment 40 and the second rotor segment 42 may be arranged in an axial stack relative to one another along the rotor axis 18. The second rotor topology may be different from the first rotor topology such that magnet pockets associated with each rotor topology have different magnet pocket arrangements.

Figure 1B:
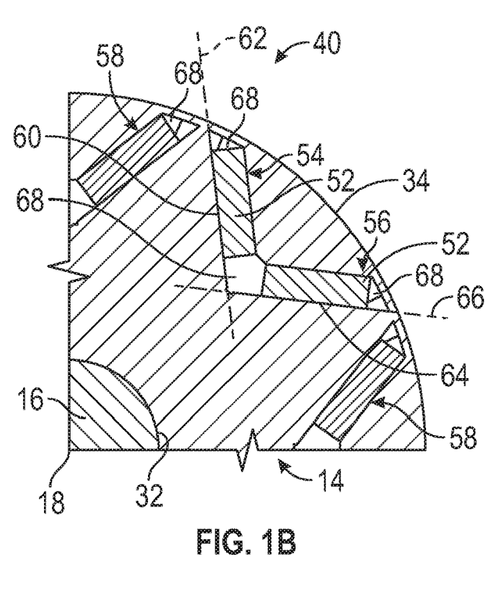
FIG. 1B is a front view, in cross-section, of the interior permanent magnet motor assembly of FIG. 1A illustrating a portion of an example of a V-type configuration rotor segment.

The first rotor topology of the first rotor segment 40 may be arranged as a V-type interior permanent magnet rotor segment as shown in, for example, FIG. 1B. In another example, the second rotor topology of the second rotor segment 42 may be arranged as a spoke-type interior permanent magnet rotor segment as shown in, for example, FIG. 1C.

Figure 1C:
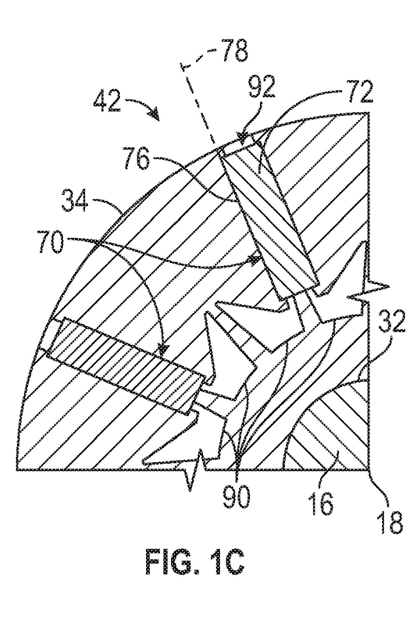
FIG. 1C is a rear view, in cross-section, of the interior permanent magnet motor assembly of FIG. 1A illustrating a portion of an example of a spoke-type configuration of a rotor segment.

A cogging torque of a V-type interior permanent magnet of the first rotor segment 40 changes a phase and an amplitude with pole arc variation, whereas a cogging phase remains unchanged in the spoke-type interior permanent magnet of the second rotor segment 42. Combining the first rotor segment 40 with the second rotor segment 42 in a single rotor assembly may potentially cancel or reduce cogging torque. It is also observed that if the back-EMF waveforms of the V-type configuration of the first rotor segment 40 and the spoke-type configuration of the second rotor segment 42 are combined, a more sinusoidal back-EMF may result.

Figure 2A:
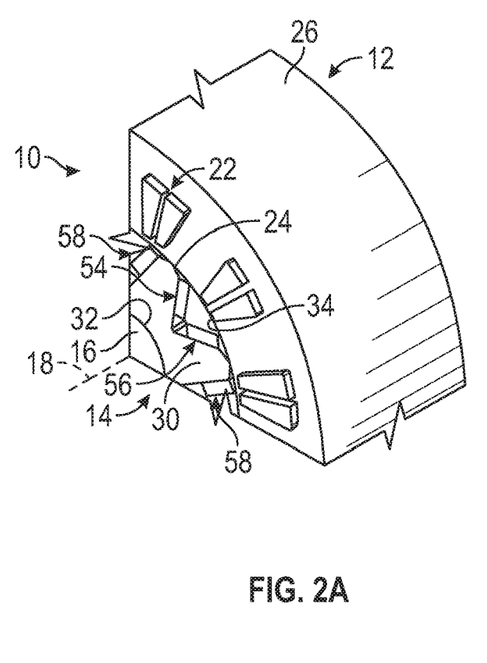
FIG. 2A is a perspective view of an example of a portion of an interior permanent magnet motor assembly.
Figure 2B:
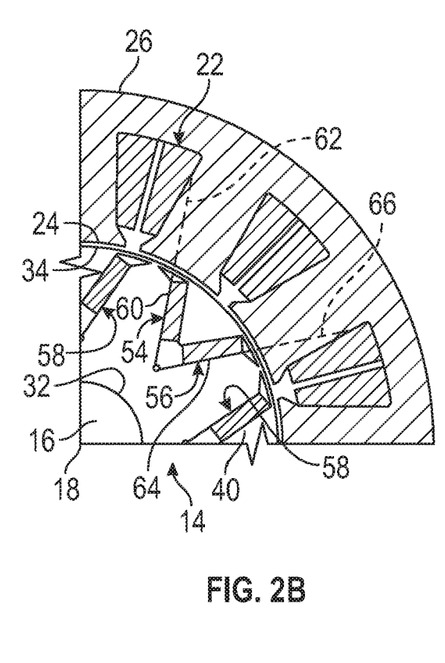
FIG. 2B is a front view, in cross-section, of the interior permanent magnet motor assembly of FIG. 2A illustrating a portion of another example of a V-type configuration of a rotor segment.
Figure 3:
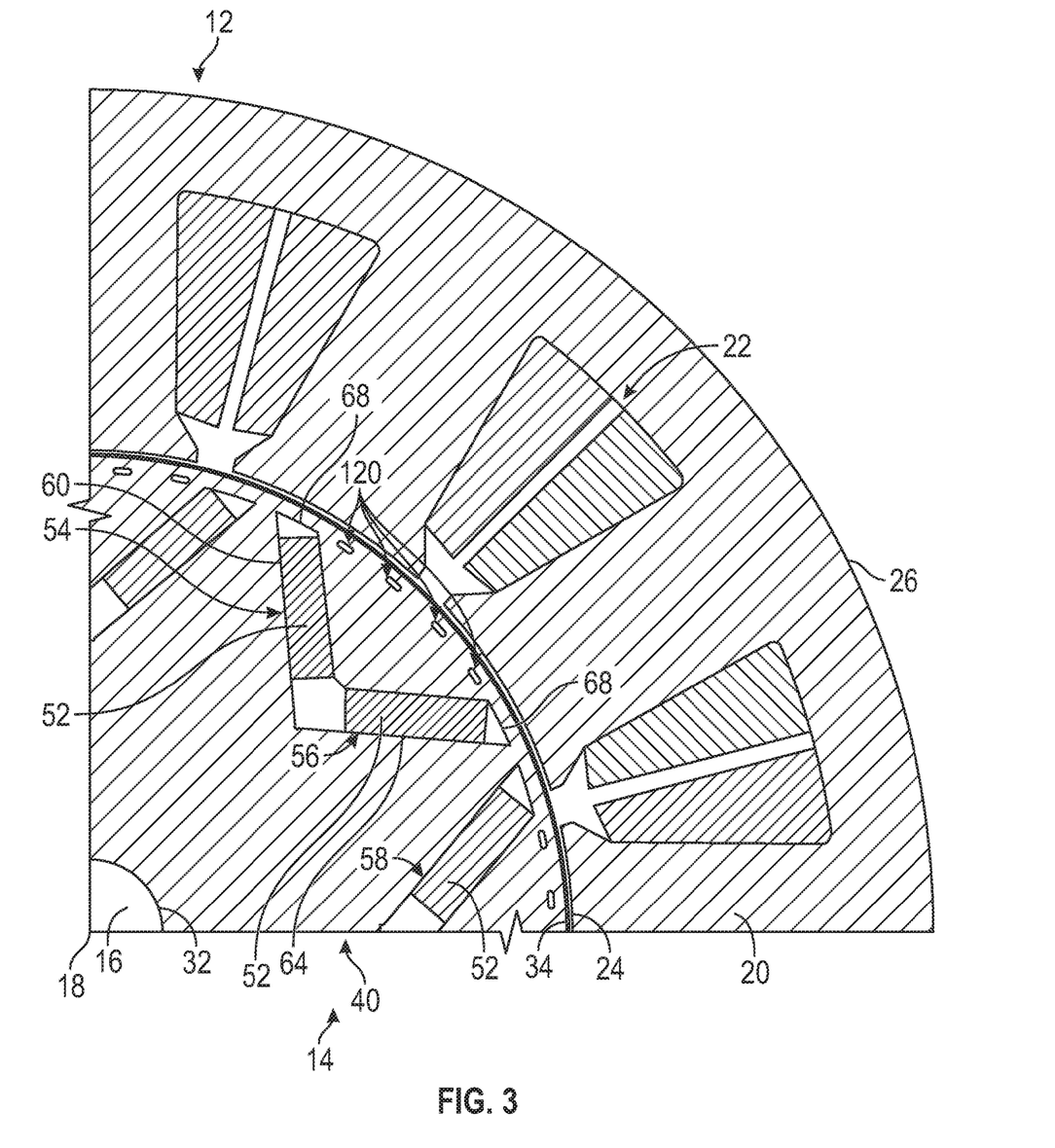
FIG. 3 is a front view, in cross-section, of yet another example of an interior permanent magnet rotor illustrating an example of flux barriers that may influence a shifting of a cogging torque waveform.

FIGS. 1B 2B, and 3 illustrate examples of a rotor topology including a V-type configuration of magnet pockets and magnets. The first rotor topology of the first rotor segment 40 may be partially defined by magnet pockets that extend at least partially through the first rotor segment 40. Each of the plurality of first magnet pockets may be arranged to receive a magnet 52 of a first magnet set. The plurality of first magnet pockets may include a first magnet pocket 54, a second magnet pocket 56, and a third magnet pocket 58.

One of the magnets of the first magnet set may be disposed within the first magnet pocket 54. The first magnet pocket 54 may include a first edge 60 that extends along a first axis 62. The second magnet pocket 56 may receive one of the magnets of the first magnet set. The second magnet pocket 56 may extend from a non-magnet pocket 68 located between the first magnet pocket 54 and the second magnet pocket 56 such that the first magnet pocket 54 and the second magnet pocket 56 are arranged to define an angle with respect to one another.

For example, the second magnet pocket 56 may include a second edge 64. The second edge 64 may extend along a second axis 66. The first axis 62 and the second axis 66 may intersect one another and define an angle therebetween. The angle therebetween may be substantially equal to between 0 degrees and 180 degrees.

The third magnet pocket 58 may be circumferentially offset, relative to the rotor axis 18, from either the first magnet pocket 54 or the second magnet pocket 56. The third magnet pocket 58 may be arranged to receive one of the magnets of the first magnet set. Air gaps or the non-magnet pockets 68 may extend from corners or ends of the first magnet pocket 54 and the second magnet pocket 56 toward the outer rotor surface 30.

FIG. 1C illustrates further detail of an example of the second rotor topology of the second rotor segment 42. For example, the second rotor segment 42 may be arranged as a spoke-type interior permanent magnet rotor segment. The second rotor topology may be defined by a plurality of second magnet pockets 70 that extend at least partially through the second rotor segment 42. Each of the plurality of second magnet pockets 70 may be arranged to receive a magnet 72 of a second magnet set.

One of the magnet pockets of the plurality of second magnet pockets 70 may include an edge 76 that extends along an axis 78. The edge 76 may at least partially extend between the inner rotor surface 32 and the outer rotor surface 34.

The magnet 72 that is disposed within one of the plurality of second magnet pockets 70 may be circumferentially disposed between the magnets 52 of the second magnet pocket 56 and the third magnet pocket 58. For example, one of the magnet pockets of the plurality of second magnet pockets 70 may be axially aligned with and spaced apart from a region 80. The region 80 may be located between the second magnet pocket 56 and the third magnet pocket 58.

The magnet pockets of the first rotor topology may be arranged to orient magnets therein to define a first magnetism north pole and the magnet pockets of the second rotor topology may be arranged to orient magnets therein to define a second magnetism north pole. The first magnetism north pole may define a first north axis and the second magnetism north pole may define a second north axis. The first north axis and the second north axis may be defined on a same axis. For example, in FIG. 1D, a first magnetism north pole may be defined at a location along a first north axis 81. A second magnetism north pole may be defined at a location along a second north axis 83. The first north axis 81 and the second north axis 83 are shown sharing a same axis.

Figures 1D, 1E, 1F:
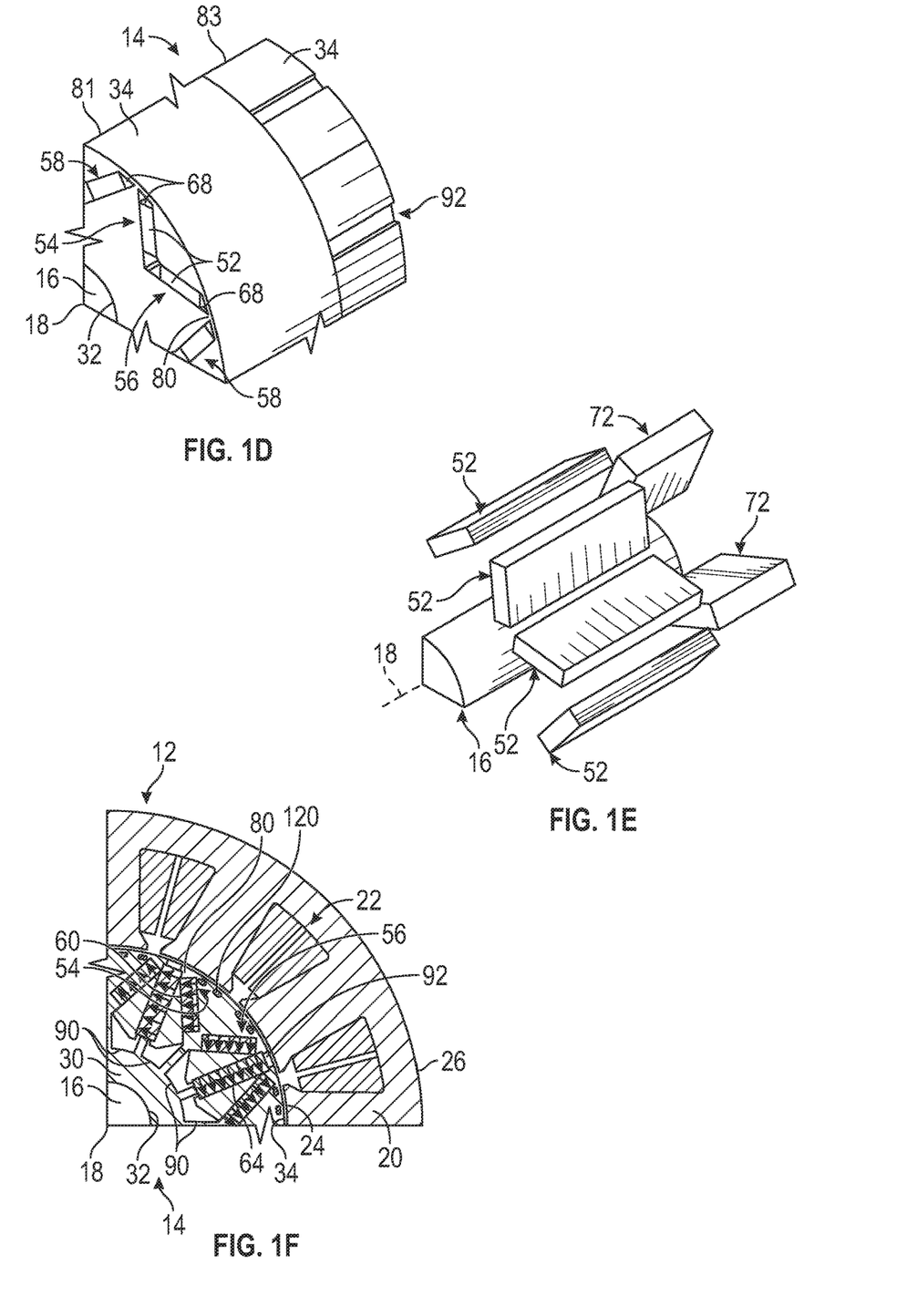
FIG. 1D is a perspective view of an example of a portion of a rotor core of the interior permanent magnet motor assembly of FIG. 1A.
FIG. 1E is a perspective view of an example of a magnet arrangement of the interior permanent magnet motor assembly of FIG. 1A.
FIG. 1F is an illustrative view showing an overlay of the cross-sectional views of FIGS. 1B and 1C to illustrate an example relationship of magnet pockets and magnets of the permanent magnet motor assembly of FIG. 1A from an axial view.

The second rotor segment 42 may define a set of first non-magnet pockets 90 and a first slot 92 as shown, for example, in FIGS. 1C and 1D. Each of the first non-magnet pockets 90 may extend from a radially inboard end of one of the second plurality of magnet pockets 70 towards the inner rotor surface 32. A pair of the first non-magnet pockets 90 may be arranged with one another to define a crown shape.

The first slot 92 may define a slot circumferential width that is measured between edges of the first slot 92. Each of the second plurality of magnet pockets 70 may define a magnet pocket circumferential width that is measured between edges of one of the second plurality of magnet pockets 70. The magnet pocket circumferential width may be greater than the slot circumferential width.

A combination of the axially stacked first rotor segment 40 having the V-type configuration and the second rotor segment 42 having the spoke-type configuration may generate acceptable sinusoidal back-EMF eliminating or reducing an order, such as a $5^{th}$ order. A rotor segment having the V-type configuration and a rotor segment having the spoke-type configuration that are axially stacked relative to each other may improve back-EMF constant as compared to a V-type configuration by itself. The cogging peak to peak may also be reduced.

Referring now to FIGS. 2A-2F, the rotor assembly 14 of the interior permanent magnet motor assembly 10 may include a third rotor segment having a third rotor topology similar to the first rotor topology as previously described and a fourth rotor segment having a fourth rotor topology. The fourth rotor segment may be axially stacked relative to the third rotor segment along the rotor axis 18. The fourth rotor topology may be different from the third rotor topology. The third rotor topology of the third rotor segment may be arranged as a V-type configuration as previously described.

Figure 2C:
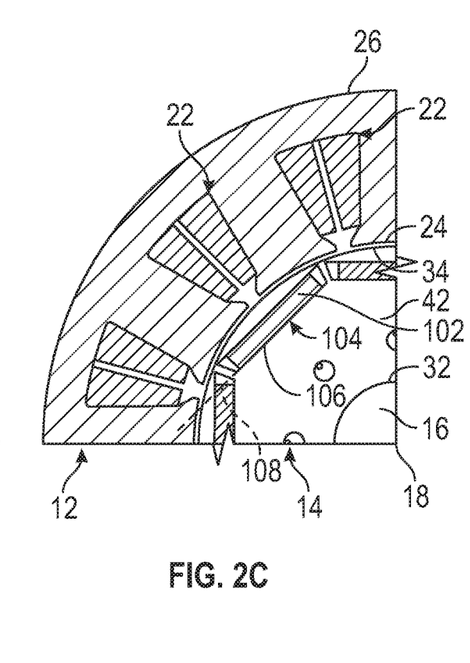
FIG. 2C is a rear view, in cross-section, of the interior permanent magnet motor assembly of FIG. 2A illustrating a portion of an example of an I-type configuration of a rotor segment.

The fourth rotor topology may be arranged as a bar-type or an I-type interior permanent magnet rotor segment as shown in, for example, FIG. 2C. The fourth rotor topology may be defined by a plurality of fourth magnet pockets that extend through the fourth rotor segment and each being arranged to receive a magnet 102 of a fourth magnet set.

Figure 2D:
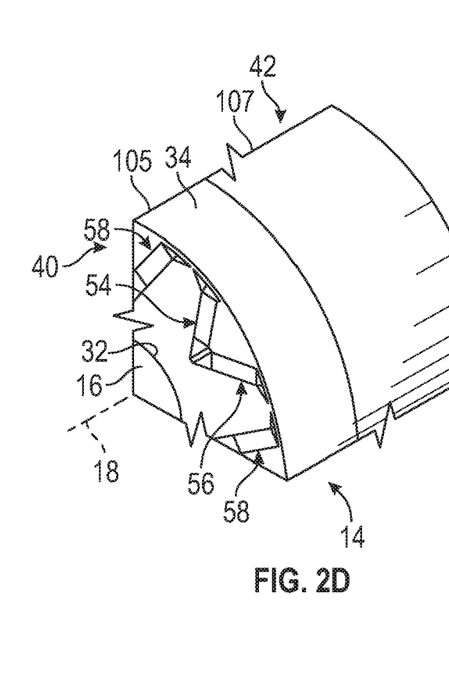
FIG. 2D is a perspective view of an example of a portion of a rotor core of the interior permanent magnet motor assembly of FIG. 1A.

The magnet pockets of the third rotor topology may be arranged to orient magnets therein to define a third magnetism north pole and the magnet pockets of the fourth rotor topology may be arranged to orient magnets therein to define a fourth magnetism north pole. The third magnetism north pole may define a third north axis and the fourth magnetism north pole may define a fourth north axis. The third north axis and the fourth north axis may be defined on a same axis. For example, FIG. 2D shows a third magnetism north pole that may be defined at a location along a third north axis 105 and a fourth magnetism north pole may be defined at a location along a fourth north axis 107. The third north axis 105 and the fourth north axis 107 are shown sharing a same axis.

A magnet pocket 104 of the plurality of fourth magnet pockets may include an edge 106 that extends along an axis 108 as shown in, for example, FIG. 2C. In one example, the edge 106 of the magnet pocket 104 may intersect the outer rotor surface 34 at only two points.

Figure 2E:
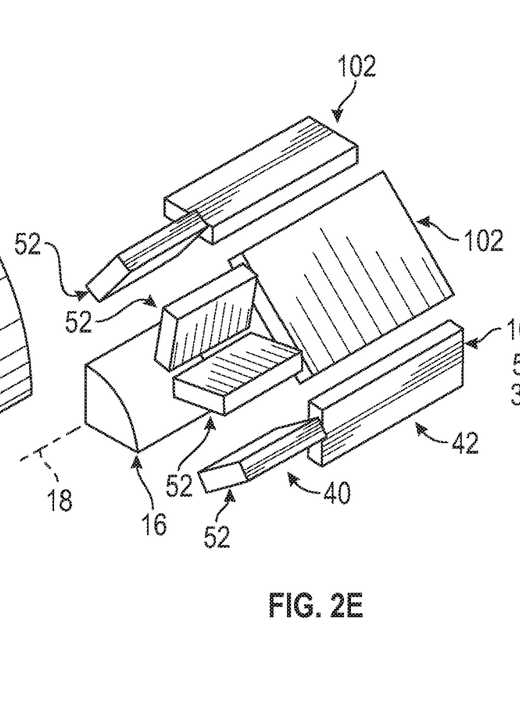
FIG. 2E is a perspective view of an example of a magnet arrangement of the interior permanent magnet motor assembly of FIG. 2A.
Figure 2F:
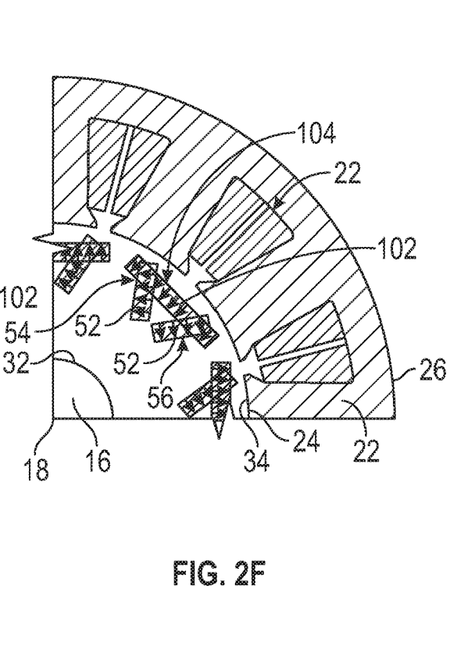
FIG. 2F is an illustrative view showing an overlay of the cross-sectional views of FIGS. 2B and 2C to illustrate an example relationship of magnet pockets and magnets of the permanent magnet motor assembly of FIG. 2A from an axial view.

FIG. 2E illustrates an example of a portion of an assembly including a magnet arrangement in which a rotor segment includes a V-type configuration and another rotor segment includes a I-type configuration. FIG. 2F is an illustrative view showing an overlay of the cross-sectional views of FIGS. 2B and 2C to illustrate an example relationship of magnet pockets and magnets for a permanent magnet motor assembly from an axial perspective. For example, from an axial view, the rotor segments may be arranged with one another such that the first magnet pocket 54 and the second magnet pocket 56 at least partially extend over the magnet pocket 104.

A rotor segment having the V-type configuration and a rotor segment having the bar-type configuration that are axially stacked relative to each other may improve back-EMF constant as compared to a bar-type configuration by itself.

An arrangement including the third rotor segment and the fourth rotor segment may reduce 5th order back-EMF harmonic. The arrangement including the third rotor segment and the fourth rotor segment may also reduce 7th order back-EMF harmonics. The cogging peak to peak may also be reduced. All the reductions are compared to a motor having a rotor of only the third topology or a rotor of only the fourth topology as described herein.

A combination of the V-type interior permanent magnets with the spoke-type interior permanent magnets and/or the V-type interior permanent magnets with the I-type interior permanent magnets may achieve a reduction in the back-EMF and cogging torque of the interior permanent magnet motor assembly 10. An amount of axial stack of the rotor segments may depend on magnet dimensions and magnet material properties of each adjacent rotor segment. This may result in an interior permanent magnet motor assembly employing a single stator and at least two rotor segments having two different rotor topologies (e.g. V-type and spoke-type or V-type and I-type) that are axially spaced from one another along the rotor axis 18. The implementation of different rotor topologies of the rotor assembly 14 may be termed "dual-rotor topology" or "hybrid rotor topology."

Further performance improvements of the dual rotor topology through cogging cancellation may be employed while simultaneously reducing back-EMF harmonics. Therefore, cogging of one rotor segment may need to be 180° out of phase with cogging of another rotor segment that is disposed adjacent to or is axially stacked relative to the one rotor segment.

FIGS. 1F and 3 illustrate flux barriers 120 that may be disposed adjacent a region in which the stator 12 and the rotor assembly 14 contact one another. The flux barriers 120 may be radially disposed within a rotor segment such that the flux barriers 120 are radially disposed between the outer rotor surface 34 and the inner rotor surface 32. The flux barriers 120 may be disposed on the outer rotor surface 34 of at least one of the rotor segments. The addition of the flux barriers 120 may provide a design where a rotor segment cogging is out of phase with another rotor segment cogging of a same assembly.

A first rotor segment of a plurality of rotor segments in an axial stack may define a first stack length that is measured between opposing faces of the first rotor segment. A second rotor segment of the plurality of rotor segments may define a second stack length that is measured between opposing faces of the second rotor segment. The flux barriers 120 may be combined with at least one of the first rotor segment or the second rotor segment to improve back-EMF and cogging performance.

The arrangement of the rotor assembly 14 having rotor segments provided with different rotor topologies may reduce the back-EMF harmonics and cogging torque at the same time.

FIGS. 1F and 2F further show a direction of magnetism generated by a respective magnet with directional arrows. For example, in FIG. 1F the directional arrows show magnetism of a magnet disposed within the first magnet pocket 54 travels in a direction from the outer rotor surface 34 toward the rotor axis 18. As another example, in FIG. 2F the directional arrows show magnetism of a magnet disposed within the first pocket 54 traveling in a direction different than a direction of magnetism of a magnet disposed within the magnet pocket 104.

An arrangement of rotor segments provided with different rotor topologies may provide several benefits such as: 1) a reduction in a number of magnet pieces as compared to skewed or other magnet arrangements; 2) reduced magnet total mass compared to axially stacked rotor segments having the same magnet or magnet pocket configurations; 3) improved back-EMF due to a combination of rotor segments having different rotor topologies with or without flux barriers; 4) improved cogging with or without flux barriers disposed proximate the outer surface of a rotor segment due to the shifting of a cogging peak of a rotor segment making the cogging out of phase with the cogging of the other of the rotor segments; 5) no shifting of either rotor segment's magnet flux axis along an axial length of the rotor core 30; and 6) ease of magnetization processes in production.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments or combinations of the described embodiments. Accordingly, the present disclosure is not to be seen as limited by the foregoing description.

Having thus described the present disclosure, it is claimed:

1. An interior permanent magnet motor assembly comprising:
   a stator having electromagnetic windings; and
   a rotor that is disposed concentrically with the stator about a rotor axis, the rotor having a plurality of rotor segments, the plurality of rotor segments including:
   a first rotor segment having a pair of first pockets being arranged to receive a first magnet set according to a first rotor topology, the first magnet set arranged in a V-shape configuration, and
   a second rotor segment that is axially stacked relative to the first rotor segment about the rotor axis, the second rotor segment being arranged to receive at least a second magnet of a second magnet set according to a second rotor topology having a configuration that is different than the first rotor topology, the second rotor topology being defined by an orientation of the first pockets in a spoke-type configuration, the spoke-type configuration being further defined by at least one of the first pockets being further arranged to align with a radial axis extending from a center point of the second rotor segment to define the spoke-type configuration, wherein the magnets of the first magnet set in the V-shape configuration are axially longer than the second magnet(s) of the second rotor segment in the spoke-type configuration, the first magnet set and the second magnet(s) formed of the same material.

2. The assembly of claim 1, further comprising one or more flux barriers disposed at a flux d-axis proximate the circumference of the rotor.

3. The assembly of claim 1, the second rotor segment having second pockets being arranged to receive a second magnet of the second magnet set, the first pockets and the second pockets being arranged with one another such that a first magnetism of the first magnet travels in a first direction from an outer rotor surface toward the rotor axis and such that a second magnetism of the second magnet located adjacent the first magnet travels in a second direction from the rotor axis toward the outer rotor surface.

4. The assembly of claim 3, wherein the second rotor segment defines a pair of non-magnet pockets, each of the pair of non-magnet pockets extending from one of a plurality of magnet pockets.

5. The assembly of claim 4, each of the pair of non-magnet pockets being arranged with one another to define a crown shape.

6. The assembly of claim 1, the first rotor topology being a topology in which a plurality of first magnet pockets of the first rotor segment and a plurality of second magnet pockets of the second rotor segment are arranged with one another such that one of the plurality of first magnet pockets at least partially extends over one of the plurality of second magnet pockets from an axial perspective.

7. An interior permanent magnet motor assembly comprising:
   a stator having electromagnetic windings; and
   a rotor that is disposed concentrically with the stator about a rotor axis, the rotor having a plurality of rotor segments, the plurality of rotor segments including:
   a first rotor segment having a pair of first pockets being arranged to receive a first magnet set according to a first rotor topology, each magnet of the first magnet set arranged in a V-shape configuration, and
   a second rotor segment that is axially stacked relative to the first rotor segment about the rotor axis, the second rotor segment being arranged to receive at least a second magnet of a second magnet set according to a second rotor topology having a configuration that is different than the first rotor topology, the second rotor topology being defined by an orientation of the first pockets in a rectangular bar-shape configuration, the rectangular bar-shape configuration being further defined by at least one of the first pockets being further arranged to align with a radial axis extending from a center point of the second rotor segment to define the rectangular bar-shape configuration, wherein each magnet of the second magnet set has a rectangular bar-shape is axially longer than the first magnet set in the V-shape configuration, the first magnet set and the second magnet(s) formed of the same material, the second rotor segment defining a slot that extends from an outer surface, the slot defining a slot circumferential width and each of the first pockets defining a magnet pocket circumferential width that is greater than the slot circumferential width.

8. The rotor of claim 7, the first rotor segment and the second rotor segment being arranged with one another such that at least one of the plurality of first magnet pockets extends over at least one of the plurality of second magnet pockets from an axial perspective.

9. The assembly of claim 7 further comprising one or more flux barriers disposed at a flux d-axis proximate the circumference of the rotor.

\* \* \* \* \*